United States Patent Office 3,243,419
Patented Mar. 29, 1966

3,243,419
IN SITU GENERATION OF SUSPENDING AGENT IN THE SUSPENSION POLYMERIZATION OF STYRENE
Alvin R. Ingram, Murrysville, Pa., assignor to Koppers Company, Inc., a corporation of Delaware
No Drawing. Filed Oct. 30, 1961, Ser. No. 148,735
2 Claims. (Cl. 260—93.5)

This invention relates to an improvement in suspension polymerization, and more particularly, to a method of generating the suspending agent in situ in a suspension polymerization system.

Suspension polymerization is one of the more important commercial methods for the production of polymers, such as polystyrene and styrene copolymers. In the suspension polymerization method, the polymerizable monomer or monomers, as the case may be, is suspended in water with the aid of a material known as a suspension stabilizer. The stabilizer may be chosen from several materials. One group of materials are finely divided inorganic solids, such as, for example, calcium phosphate, talc and barium sulfate. Another group of materials are water-soluble polymers known as protective colloids, such as, for example, polyvinyl alcohol, methyl, methyl-cellulose and sodium polyacrylate, etc. In addition, other materials, such as for example, anionic surface active agents, may be added. The polymerization may be initiated solely by the application of heat, but generally in order to obtain commercially useful quantities of polymer, a polymerization initiator is added to the system. Free radical-producing substances, particularly oil-soluble peroxides and azo compounds, are used as initiators. Benzoyl peroxide is probably the most commonly used initiator. The polymeric product produced by the suspension system is in the general shape of beads or spheres, on the order of from 0.5 to 5 millimeters in diameter.

An important advantage of suspension polymerization over polymerization in the absence of water is that the heat of polymerization can be easily dissipated by the water in the suspension. This allows close control of temperature.

Another advantage of suspension polymerization is the configuration of the product, beads or spheres which may be easily recovered and further fabricated.

In the suspension polymerization of vinyl monomers, the size of the particles generally increases as the polymerization proceeds. The phenomenon of increasing particle size is most rapid and noticeable when the monomer is partially polymerized or in the so-called "sticky stage."

Monomer will remain in aqueous suspension at the start of a polymerization by agitation alone. As polymerization proceeds, however, a suspending agent is needed to keep the monomer droplets, which are, at this stage of polymerization a combination of monomer and polymer, in suspension. As polymerization progresses, greater and greater amounts of suspending agent are needed to maintain the suspension in a stable form.

The general practice in suspension polymerization is to add sufficient suspending agent at the beginning of the polymerization so that there is enough suspending agent to maintain the suspension until completion of polymerization. This addition of sufficient suspending agent at the start of polymerization precludes the possibility of suspension failure during the polymerization because of insufficient suspending agent. However, the excess of suspending agent results in a less desirable, in that it is wider, bead size distribution. In addition to the wide bead size distribution, the average bead size is smaller and the amount of fines, that is powdery particles carrying a very high static charge, is correspondingly larger. These very small beads or fines are difficult to handle, because of their static charge. Also, they present problems in extrusion in that they slip between the screw and barrel of the extruder.

I have now discovered a way of producing the suspending agent in situ during the polymerization. The amount of suspending agent produced in situ during polymerization is sufficient to maintain the suspension.

The most critical period in the suspension polymerization process, that is, the period where failure of the suspension may occur, is the period prior to the time the monomer droplets will no longer coalesce at the temperature of polymerization, the previously referred to, "sticky stage." Having safely passed this point, completion of polymerization is generally accomplished without danger of suspension failure. It is therefore imperative that there be sufficient suspending agent during the polymerization up to this point so as to prevent suspension failure; correspondingly there should not be enough suspending agent present to cause the formation of an excessive quantity of fines.

According to the process of my invention, this critical amount of suspending agent is produced in situ by adding to the polymerization system of the water insoluble vinyl or primary monomer, a second water-soluble monomer. The second water-soluble monomer is one whose polymer or whose copolymer with the primary monomer is a suspending agent for the polymerization system. One example of such a system is a primary monomer of styrene and a secondary monomer of methacrylamide. Using this system, sufficient suspending agent may be generated to properly maintain the suspension.

The specific amounts of the various components used in the polymerization process will vary with the particular reactants used but will be relatively easily ascertained by the worker in the art.

The catalyst, or as it is more often referred to the polymerization initiator, is chosen from any of the known styrene-soluble free-radical-producing initiators, such as are listed in the body by Boundy and Boyer, Styrene, Its Polymers, Copolymers and Derivatives, Reinhold Publishing Corporation, 1952. I have found that benzoyl peroxide and a combination of benzoyl peroxide and tertiary-butyl perbenzoate are suitable. Other catalyst systems which may be used are set forth in United States Patents 2,656,334; 2,592,251; 2,692,260; and 2,907,756. Using common principles of polymerization, the proportion of initiator and the temperature of polymerization are adjusted to produce a product of the desired molecular weight in a minimum amount of time.

The rate of polymerization is, as stated above, to some extent dependent upon the polymerization catalyst used or alternatively the polymerization catalyst may be chosen to fit any particular cycle. The particular heating or polymerization schedule used will be a matter of choice and dependent upon the initiator. The specific conditions used will not have any great effect on the process of the invention. However, a faster cycle is obviously to be preferred over a slower cycle at least from the commercial point of view, because of the increased production possible thereby. The temperatures and pressures useful will depend largely on the euipment available. Pressures of more than 150 p.s.i.g. and temperatures of as high as about 140° C. can be used. Of course, any less severe temperatures under which polymeriztaion will occur may also be used.

The ratio of monomer to water which may be used should be, from a practical point, as high as possible. I have found that it is possible to polymerize at a slightly greater than 1:1 ratio of monomer to water, i.e., 55 parts of sytrene and 45 parts of water. The lower limit is, from a practical viewpoint, of little importance, because of the commercially desirable goal of obtaining the greatest possible amount of product per polymerization.

The following examples further illustrate the practice of the invention.

EXAMPLE I

Into a two-liter polymerization reactor provided with a propeller-type stirrer and a thermowell baffle, there was introduced a first solution of 25 grams of methacrylamide in 500 grams of water and a second solution of 25 grams of methacrylamide and the polymerization initiator system of 1.0 gram of benzoyl peroxide and 0.25 gram of t-butyl perbenzoate in 450 grams of styrene.

The styrene was polymerized by heating the mixture for 8 hours at 90° C. while stirring. The polymer was filtered on an 80-mesh screen to remove a minor quantity of emulsion polymer, washed and dried. The polymer particles were spherical and were classified on a Ro-Tap machine as to particle size through four screens of United States Bureau of Standards specifications. The bead size distribution was:

| U.S. sieve | Percentage |
|---|---|
| On 10-mesh (2.0 mm. openings) | 0.0 |
| Through 10-mesh—on 20-mesh (0.84 mm. openings) | 16.0 |
| Through 20-mesh—on 30-mesh (0.59 mm. openings) | 13.8 |
| Through 30-mesh—on 40-mesh (0.42 mm. openings) | 21.2 |
| Through 40-mesh—on 80-mesh (0.12 mm. openings) | 49.0 |

Comparative Example I

Example I was repeated except that no methacrylamide was added. The suspension failed within two hours at 90° C.

EXAMPLE II

Example I was exactly duplicated with the exception that 100 grams of injection molding grade polystyrene (instrinsic viscosity of 0.90 in toluene at 30° C. ASTM heat distortion temperature, 201° F.) was also dissolved in the styrene phase prior to addition to the water phase. The following distribution of particle sizes was obtained:

| U.S. sieve No.: | Percentage |
|---|---|
| On 10 | 0.7 |
| Through 10—on 20 | 26.2 |
| Through 20—on 30 | 13.3 |
| Through 30—on 40 | 29.2 |
| Through 40—on 80 | 31.3 |

The nitrogen content of the copolymer was determined and found to be 0.17%. This corresponds to 1.0% methacrylamide.

This example illustrates the production of a copolymer using as one of the constituents a previously produced polymer. Other polymers or copolymers could equally well be used.

EXAMPLE III

Example II was repeated with the exception that acrylamide was used in place of methacrylamide and the quantity of predissolved polystyrene was reduced to 50 grams. The distribution of particle sizes was:

| U.S. sieve No: | Percentage |
|---|---|
| On 10 | 0.2 |
| Through 10—on 20 | 24.7 |
| Through 20—on 30 | 16.5 |
| Through 30—on 40 | 18.3 |
| Through 40—on 80 | 40.3 |

The nitrogen content of the copolymer was determined and found to be 0.13%. This corresponds to 0.61% acrylamide.

This example is illustrative of the use of another comonomer, acryamide for the methacrylamide used in the foregoing examples.

Proof that the polymer which acts as suspending agent is generated in situ is obtained from examination of the methacrylamide and the acrylamide. Polymers of these substances will suspend polystyrene but both of the products used in these examples were determined to be free of polymer. Therefore, any suspending agent must have been produced during the suspension polymerization.

EXAMPLE IV

In a two-liter flask of the type used in Example I, there was introduced 500 grams of water, 50 grams of sodium chloride and 15 grams of methacrylamide. To this was added 10 grams of methacrylamide, 100 grams of injection molding grade polystyrene, 1.0 gram of benzoyl peroxide and 0.25 gram of t-butyl perbenzoate in 450 grams of styrene. The polymerization time required to obtain hard beads was 8 hours. The bead size distribution was:

| U.S. sieve No.: | Percentage |
|---|---|
| On 10 | 0.9 |
| Through 10—on 20 | 3.9 |
| Through 20—on 30 | 12.4 |
| Through 30—on 40 | 36.4 |
| Through 40—on 80 | 65.0 |

The nitrogen content and the corresponding methacrylamide content were respectively, 0.21% and 1.28%. These beads were of limited solubility, indicative of the formation of some authentic copolymer. The solubility was determined in xylene at 120–130° C. and the insoluble matter amounted to 6.5%. If all the methacrylamide entered the organic phase, the methacrylamide content would be 8.3%.

Comparative Example IV

Example IV was repeated except that 150 grams rather than 50 grams of sodium chloride was used. The polymerization time required to obtain hard beads was reduced to 2 hours from the 8 hours of Example IV. The particle size distribution was:

| U.S. sieve No.: | Percentage |
|---|---|
| On 10 | 0.5 |
| Through 10—on 20 | 17.7 |
| Through 20—on 30 | 15.7 |
| Through 30—on 40 | 20.9 |
| Through 40—on 80 | 43.3 |

The nitrogen content of the beads was 0.45% corresponding to 2.7% methacrylamide. The solubility was determined as above and found to be 89.5%.

The above illustrates an attempt to reduce the amount of methacrylamide lost, that is not becoming part of the polymer, by conducting the polymerization in the presence of an electrolyte. Although successful to some extent, as can be seen by comparison with the results obtained in the foregoing examples, the attempt was not altogether successful because in theory, the methacrylamide content would have been 8.3%.

EXAMPLE V

Examples I and II were repeated with styrene-methacrylamide monomer charges of 24/1, 32/1 and 49/1, in each case resulting in a failure of the suspension early in the polymerization. However, a 97/3 comonomer charge (5 grams of methacrylamide in the water and 10 grams in the styrene) according to the formulation of Example IV with 150 grams of salt in the water phase yields a stable dispersion of polymer with the following bead size distribution:

| U.S. sieve No.: | Percentage |
|---|---|
| On 10 | 2.3 |
| Through 10—on 20 | 22.0 |
| Through 20—on 30 | 10.2 |
| Through 30—on 40 | 22.0 |
| Through 40—on 80 | 42.2 |

The nitrogen content was 0.19%, corresponding to 1.15% of methacrylamide. With all the methacrylamide in the organic phase, the methacrylamide content would be 2.5%.

EXAMPLE VI

When hydroxyapatite and a wetting agent are used to prepare polystyrene by suspension polymerization in the apparatus used for the above examples, one obtains beads with a distribution of sizes similar to that indicated in the preceding examples. Specifically, in the two-liter resin kettle to a dispersion of 6.0 grams of hydroxyapatite ($3Ca_3(PO_4)_2 1Ca(OH)_2$, 95% through a 200-mesh sieve) in 500 grams of water and 0.015 gram of Nacconol NRSF (dodecylbenzene sodium sulfonate) was added a solution of 1.0 gram of benzoyl peroxide and 0.25 gram of t-butyl perbenzoate in 500 grams of styrene. Beads with the following size distribution were obtained on two different days:

| U.S. sieve No.: | Percentage of product |
|---|---|
| On 10 | 2.5—2.7 |
| Through 10—on 20 | 42.2—24.4 |
| Through 20—on 30 | 24.2—21.4 |
| Through 30—on 40 | 17.0—20.7 |
| Through 40 | 15.1—30.8 |

EXAMPLE VII

Example VI was repeated except that the amount of hydroxyapatite used was 5 grams rather than the 6 grams and the bead size distribution was as set out below:

| U.S. sieve No.: | Percentage of product |
|---|---|
| On 10 | 9.2—15.4 |
| Through 10—on 20 | 46.3—52.0 |
| Through 20—on 30 | 14.3—13.6 |
| Through 30—on 40 | 12.5—10.1 |
| Through 40 | 17.7—8.9 |

The foregoing has described a novel process for the in situ generation of suspending agent particularly useful in the suspension polymerization of styrene polymers.

I claim:

1. In the suspension polymerization of styrene, to form a substantial homopolymer of styrene the improvement comprising: generating the sole suspending agent in situ during the polymerization by adding to an aqueous dispersion of said styrene a free radical polymerization initiator, and a monomer selected from the group consisting of acrylamide and methacrylamide said monomer being present in an amount to give a styrene to monomer ratio of about 9:1 by weight to thereby form a polymer of said monomer which polymer is a suspending agent for said styrene, initiating polymerization of said styrene by heating said dispersion and continuing polymerization to substantial completeness.

2. An improvement in the suspension polymerization of styrene to form a substantial homopolymer of styrene comprising generating the sole suspending agent in situ by polymerizing water insoluble styrene in the presence of a water soluble monomer that simultaneously undergoes polymerization to provide a suspending agent for the particles of polystyrene comprising the steps of forming an admixture of an aqueous dispersion of styrene, a free radical polymerization initiator, and a water soluble monomer selected from the group consisting of acrylamide and methacrylamide said monomer being present in an amount to give a styrene to monomer ratio of about 9:1 by weight and subjecting said dispersion to polymerization conditions to thereby form a polymer of said water soluble monomer to suspend said styrene polymer in said water for a suspension polymerization.

References Cited by the Examiner

UNITED STATES PATENTS 3,108,979  10/1963  LeFevre et al. _____ 260—89.5

FOREIGN PATENTS 546,459  7/1942  Great Britain.

OTHER REFERENCES

Schildknecht, Polymer Processes, N.Y., Interscience, 1956, pp. 71–72.

JOSEPH L. SCHOFER, *Primary Examiner.*

MORRIS LIEBMAN, *Examiner.*

D. E. OLSON, J. A. SEIDLECK, *Assistant Examiners.*